(12) United States Patent
Lee et al.

(10) Patent No.: US 9,823,790 B2
(45) Date of Patent: Nov. 21, 2017

(54) TOUCH SENSING APPARATUS AND METHOD OF DRIVING THE SAME

(71) Applicant: Anapass Inc., Seoul (KR)

(72) Inventors: Jong Hwa Lee, Seoul (KR); Woo Hyoung Seo, Seoul (KR); Ha Sun Song, Seoul (KR)

(73) Assignee: ANAPASS INC., Seoul (KR)

(*) Notice: Subject to any disclaimer, the term of this patent is extended or adjusted under 35 U.S.C. 154(b) by 254 days.

(21) Appl. No.: 14/504,480

(22) Filed: Oct. 2, 2014

(65) Prior Publication Data
US 2015/0103041 A1   Apr. 16, 2015

(30) Foreign Application Priority Data
Oct. 15, 2013   (KR) .................... 10-2013-0122714

(51) Int. Cl.
*G06F 3/044*   (2006.01)

(52) U.S. Cl.
CPC .................... *G06F 3/044* (2013.01)

(58) Field of Classification Search
CPC .................. G06F 3/044; G06F 3/0416; G06F 2203/04106; G06F 3/03545; G06F 3/046; H04N 5/32; H04N 5/378; H04N 5/374; H04N 5/3698; H04N 5/359
See application file for complete search history.

(56) References Cited

U.S. PATENT DOCUMENTS

| | | | |
|---|---|---|---|
| 7,920,129 B2 | 4/2011 | Hotelling et al. | |
| 8,547,114 B2* | 10/2013 | Kremin | G06F 3/044 324/678 |
| 8,797,294 B2* | 8/2014 | Souchkov | G06F 3/0416 178/18.03 |
| 2005/0073324 A1* | 4/2005 | Umeda | G01R 27/2605 324/662 |
| 2014/0320172 A1* | 10/2014 | Hsu | H02M 11/00 327/103 |

* cited by examiner

*Primary Examiner* — Kent Chang
*Assistant Examiner* — Scott Au
(74) *Attorney, Agent, or Firm* — Paratus Law Group, PLLC

(57) ABSTRACT

Provided are a touch sensing apparatus and a method of driving the same. The touch sensing apparatus includes a signal source configured to output a driving signal, a touch panel configured to be driven by the driving signal output by the signal source and output a current signal generated using the driving signal, a charge amplifier configured to convert the current signal output by the touch panel into a voltage signal, and a controller configured to control the charge amplifier to be periodically reset.

10 Claims, 8 Drawing Sheets

(a)

(b)

(c)

(d)

(a)

(b)

TOUCH SENSING APPARATUS AND METHOD OF DRIVING THE SAME

CROSS-REFERENCE TO RELATED APPLICATION

This application claims priority to and the benefit of Korean Patent Application No. 2013-0122714, filed on Oct. 15, 2013, the disclosure of which is incorporated herein by reference in its entirety.

BACKGROUND

1. Field of the Invention

The present invention relates to a touch sensing apparatus and a method of driving the same.

2. Discussion of Related Art

Currently, resistive touch screens, surface acoustic wave (SAW) touch screens, and capacitive touch screens are mainly in use. Capacitive touch screens are capable of sensing multiple touches and have excellent durability, sensibility, and so on. Therefore, there is a current trend toward adopting capacitive touch screens as the major input units of mobile devices.

A capacitive touch screen senses a change in the amount of charge caused by a user's interference in capacitive sensors on a touch screen panel, thereby recognizing the user's input. Capacitive touch screens are classified into a self-capacitive type and a mutual-capacitive type according to charge accumulation methods. In a self-capacitive touch screen, each capacitive sensor constitutes one electrical conductor and forms electrified surfaces together with a reference ground surface outside a touch screen panel. On the other hand, in a mutual-capacitive touch screen, two electrical conductors on a touch screen panel form electrified surfaces and function as one capacitive sensor.

A general self-capacitive touch screen employs an orthogonal X/Y disposition of electrical conductors, and in this case, each capacitive sensor functions as a line sensor. Therefore, every time the touch screen attempts to sense a touch, only one piece of X-sensing information and one piece of Y-sensing information are provided by an X-line sensor group and a Y-line sensor group, respectively. Therefore, the general self-capacitive touch screen is capable of sensing and tracking a single touch but incapable of supporting multiple touches. A mutual-capacitive touch screen also employs an orthogonal X/Y disposition of electrical conductors, but is different from the self-capacitive touch screen in that each capacitive sensor is configured in the form of a grid sensor at every position where electrical conductors cross at right angles and responses of all grid sensors are separately sensed upon attempting to detect a user's input on the touch screen. Since the respective grid sensors correspond to different X/Y coordinates and provide separate responses, the mutual-capacitive touch screen may extract a user's input information from an X/Y-sensing information provided by an X/Y grid sensors set to sense and track the user's multiple touches.

A general mutual-capacitive touch screen panel has the following electrical conductor configuration and sensing method. First electrodes consisting of electrical conductors extending in any one direction and second electrodes consisting of electrical conductors extending in a direction crossing the first electrodes at right angles form mutual-capacitive sensors with a dielectric material interposed between the first electrodes and the second electrodes. When the distances between the first electrodes and the second electrodes are d, the areas of electrified surfaces are a, and the equivalent permeability of all dielectric materials between the electrified surfaces is $\in$, a capacitance C of each sensor is defined as $C=\in*a/d$, and has a relationship of $Q=CV$ with an amount Q of charge accumulated in the sensor and a potential difference (voltage) V applied to two electrodes/electrified surfaces. When a user approaches a sensor, interference occurs in an electric field formed between two electrodes and disturbs the accumulation of charge in the sensor. Then, the amount of charge accumulated in the sensor decreases, and as a result, capacitance is reduced. This may be understood as a change in capacitance resulting from a change in the equivalent permeability between the electrified surfaces caused by the user's approach, but is actually a physical phenomenon in which a part of the electric field between the electrified surfaces is shunted due to the user's approach and the amount of charge/accumulated charge is reduced. When an alternating current (AC) waveform is applied to one electrified surface of a sensor by connecting an AC voltage source to the first electrode, a change $\Delta Q$ in the amount of charge corresponding to $\Delta Q=C\Delta V$ occurs with respect to C that is changed according to the degree of a user's approach, and a read-out circuit connected to the second electrode converts the change $\Delta Q$ into current or voltage. Information converted in this way is generally subjected to signal processing operations, such as noise filtering, demodulation, digitizing, and accumulation, and then used in a coordinate tracking algorithm and a gesture recognition algorithm. U.S. Pat. No. 7,920,129 discloses such a capacitive touch sensitive panel.

SUMMARY OF THE INVENTION

A signal output by the touch panel when a touch panel is touched by an object, is a current signal that is generated by the object shunting electric field flux formed between a driving electrode and a sensing electrode and modulated by a driving signal applied from a signal source to the driving electrode. An existing touch sensing device integrates a current signal output from a touch panel using an integrator, thereby converting the current signal into the form of voltage. Also, a touch sensing device is used in various surroundings, and thus is affected by noise based on the surroundings in which the touch sensing device is used.

To improve a signal-to-noise ratio (SNR), an output signal of an integrator to which a touch signal obtained by a touching object is applied should swing to its maximum compared to noise. According to related art, in order to obtain a large SNR, the amplitude of a driving signal is amplified using a charge pump, and then the driving signal is applied to a driving electrode. However, when a charge pump is used as in the related art, a plurality of high-capacity capacitors should be prepared outside a chip, and a plurality of chip pins for connecting the capacitors with the chip should be further formed, which is uneconomical.

In addition, a current signal output by a touch panel is converted into a voltage signal by an integrator, and the voltage signal is applied to an analog-digital converter (ADC) and converted into a digital signal, or is demodulated to the direct current (DC) domain using a demodulator and then converted by an ADC.

To directly apply a voltage signal output by an integrator of such related art to an ADC and convert the voltage signal into a digital signal, a high-performance ADC operating at a high operating frequency is necessary, which is uneconomical in terms of chip size and power consumption. Also, even when the signal output by the integrator is demodulated for down conversion and then the down-converted signal is input to an ADC and converted into a digital signal, a chip area is necessary to form a demodulator, and it is uneconomical in terms of power consumption.

The present invention is directed to providing a touch sensing apparatus including a charge amplifier capable of obtaining a signal swinging with a large amplitude and yielding a high signal-to-noise ratio (SNR) without an increase in the amplitude of a driving signal or a charge pump formed outside a chip.

The present invention is also directed to providing a touch sensing apparatus capable of down-converting a touch signal modulated by a high frequency without using a high-performance analog-digital converter (ADC) or mixer.

The present invention is also directed to providing a method of driving a touch sensing apparatus capable of overcoming the drawbacks of the related art described above.

According to an aspect of the present invention, there is provided a touch sensing apparatus including: a signal source configured to output a driving signal; a touch panel configured to be driven by the driving signal output by the signal source and output a current signal generated using the driving signal; a charge amplifier configured to convert the current signal output by the touch panel into a voltage signal; and a controller configured to control the charge amplifier to be periodically reset.

According to another aspect of the present invention, there is provided a method of driving a touch sensing apparatus, the method including: applying a driving signal to a touch panel; outputting a current signal generated using the applied driving signal; and converting the current signal using a charge amplifier. The charge amplifier is periodically reset to convert the current signal.

According to another aspect of the present invention, there is provided a touch sensing apparatus including: a signal source configured to output a driving signal having an edge; a touch panel configured to receiving the driving signal and output a current signal modulated by the driving signal; a signal conversion unit configured to convert the current signal output by the touch panel into a voltage signal; and a controller configured to control the signal conversion unit so that a time point at which the edge of the driving signal is applied to the touch panel is included in a signal conversion unit reset period. The signal conversion unit is periodically reset to down-convert the current signal into a voltage signal and output the voltage signal.

According to another aspect of the present invention, there is provided a method of driving a touch sensing apparatus, the method including: applying a driving signal having an edge to a touch panel; generating a current signal modulated by the driving signal applied to the touch panel; and converting the current signal into a voltage signal using a signal conversion unit. The converting of the current signal into the voltage signal includes controlling the signal conversion unit so that a time point at which the edge of the driving signal is applied to the touch panel is included in a signal conversion unit reset period, and down-converting the current signal into the voltage signal.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
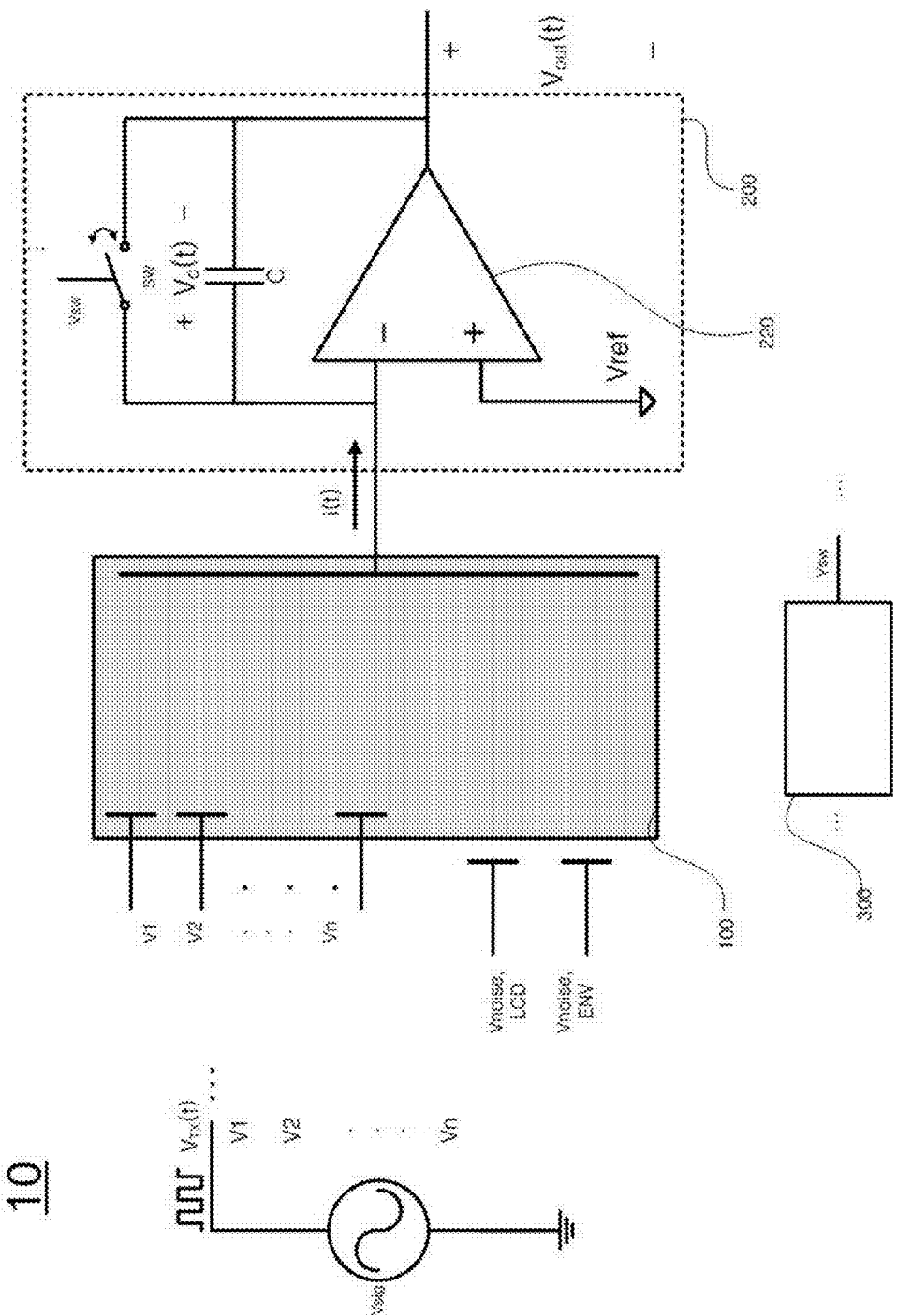
FIG. 1 is a diagram showing the overview of a touch sensing apparatus according to an exemplary embodiment.

Specific structural and functional details disclosed herein are merely representative for purposes of describing the exemplary embodiments of the present invention, and the present invention may be embodied in many alternate forms and should not be construed as limited to the exemplary embodiments of the present invention set forth herein. Accordingly, while the present invention is susceptible to various modifications and alternative forms, specific embodiments thereof are shown by way of example in the drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention.

The terminology used in this specification should be understood as follows.

The terms "first," "second," etc. are used to describe various elements. However, the scope of the present invention should not be limited by these terms since these terms are only used to distinguish one element from other elements. For example, a first element could be termed a second element, and vice versa.

It will be understood that when an element is referred to as being "on" another element, it can be directly on the other element, or intervening elements may also be present. On the other hand, it will be understood that when an element is referred to as being "in contact with" another element, there is no intervening element. Meanwhile, other terms for describing relationships between elements, that is, "interposed between" and "directly interposed between," "between" and "directly between," "adjacent to" and "directly adjacent to," etc., will be understood in the same way.

The singular forms "a," "an," and "the" are intended to include the plural forms as well, unless the context clearly indicates otherwise. It will be further understood that the terms "comprises," "comprising," "includes," and "including," when used herein, specify the presence of stated features, integers, steps, operations, elements, parts, or combinations thereof, but do not preclude the presence or addition of one or more other features, integers, steps, operations, elements, parts, or combinations thereof.

It should also be noted that in some alternative implementations, the functions/steps noted in the blocks may occur out of the order noted in the flowcharts. For example, two blocks shown in succession may in fact be executed substantially concurrently or the blocks may sometimes be executed in the reverse order, depending upon the functionality/steps involved.

In reference drawings for describing exemplary embodiments of the present disclosure, size, height, thickness, etc. are intentionally exaggerated for convenience of description and ease of understanding, but are not enlarged or reduced according to a ratio. Also, in the drawings, some elements may be intentionally reduced, and other elements may be intentionally enlarged.

Unless otherwise defined, all terms used herein have the same meaning as commonly understood by those of ordinary skill in the art to which the present invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
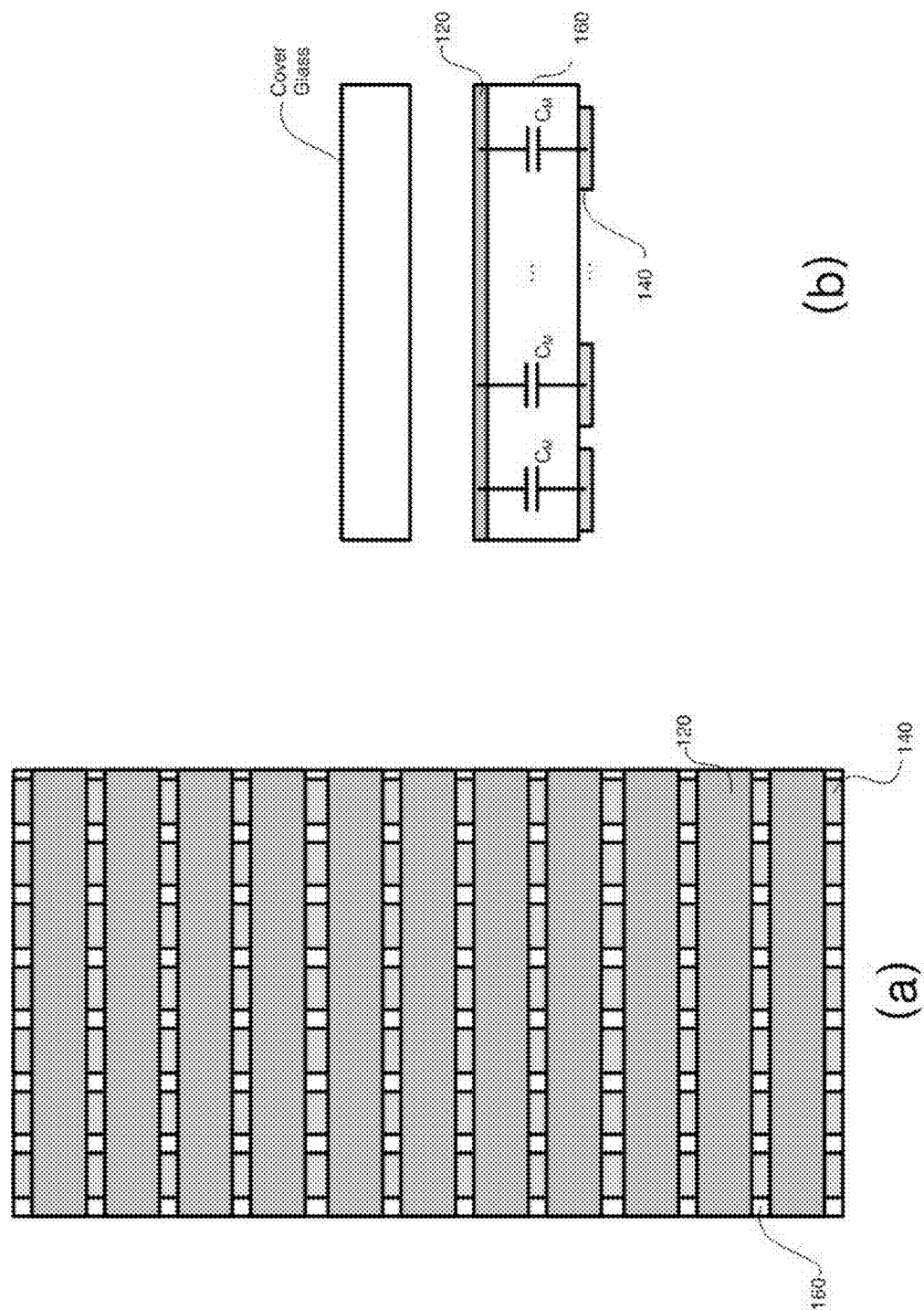
FIG. 2 is a diagram schematically showing the structure of a touch panel.

FIG. 1 is a diagram showing the overview of a touch sensing apparatus according to an exemplary embodiment, and FIG. 2 is a diagram schematically showing the structure of a touch panel 100. Referring to FIGS. 1 and 2, a touch sensing apparatus according to an exemplary embodiment of the present invention includes a signal source that outputs a driving signal, a touch panel that is driven by the driving signal output by the signal source and outputs a current signal generated using the driving signal, a charge amplifier that converts the current signal output by the touch panel into a voltage signal, and a controller that controls the charge amplifier to be periodically reset.

Referring to FIGS. 1 and 2, the touch panel 100 includes sensing electrodes 120, driving electrodes 140, and a substrate 160. In an exemplary embodiment, the substrate 160 is formed of a transparent dielectric material, and a cover glass is formed on the upper surface of the substrate 160, thus allowing an image displayed by a display device, such as a liquid crystal display (LCD) or an active matrix organic light emitting diode (AMOLED) display, disposed on the lower surface of the substrate 160 to pass through the substrate 160 and the cover glass. As an example, the substrate 160 is formed of glass. The sensing electrodes 120 and the driving electrodes 140 disposed on the substrate 160 all are formed to be transparent and thus may detect an object while displaying an image through themselves. As another example, the substrate 160 may be formed of an opaque dielectric material to only detect a touch of an object.

In this specification, an object with which a user is able to apply an input to a touch panel is defined as an "object." Such an object denotes an entity that may shunt electric field flux formed between first and second electrodes and apply a touch input to the touch panel 100, such as a finger, a palm, or a stylus. However, these are merely intended for description of an object and not intended to limit the range of an object. Therefore, an object may be a user's cheek, toe, etc., in addition to the aforementioned finger, palm, or stylus.

Referring to FIG. 2, the plurality of sensing electrodes 120 extending in a first direction are disposed on one surface of the substrate 160. The plurality of driving electrodes 140 extending in a second direction crossing the first direction at right angles and arranged in parallel are disposed on the other surface of the substrate 160. The driving electrodes 140 form mutual capacitors with the sensing electrodes 120. As an example, the driving electrodes 140 and the sensing electrodes 120 may be formed of a transparent conductive material, thus allowing an image displayed by the display device disposed on the lower surface of the substrate 160 to pass through themselves. In an example, the driving electrodes 140 and the sensing electrodes 120 are formed of a transparent conductive material, such as indium tin oxide (ITO), indium zinc oxide (IZO), aluminum zinc oxide (AZO), and indium cadmium oxide (ICO). In another example, the driving electrodes 140 and the sensing electrodes 120 may be formed of carbon nanotubes (CNTs). CNTs may carry a higher density of current than a transparent conductive material, such as ITO.

Alternatively, although not shown in the drawing, the sensing electrodes 120 and the driving electrodes 140 all may be disposed on one surface of the substrate 160 to cross at right angles while being insulated from each other.

A signal source Vsig applies a driving signal $V_{TX}(t)$ to the driving electrodes 140 of the touch panel 100, and the driving signal $V_{TX}(t)$ is a pulse train. FIG. 3(a) shows a case in which the driving signal $V_{TX}(t)$ is a rectangular pulse train. FIG. 3(b) shows a case in which the driving signal $V_{TX}(t)$ is a ramp pulse train, and FIG. 3(c) shows a case in which the driving signal $V_{TX}(t)$ is a triangular pulse train. FIG. 3(d) shows a case in which the driving signal $V_{TX}(t)$ is a sinusoidal pulse train. Besides these, several shapes of pulse trains not shown in the drawing may be used.

The driving signal $V_{TX}(t)$ applied by the signal source Vsig is applied to any one of the driving electrodes 140 of the touch panel 100 and generates electric field flux with a sensing electrode 120. An object touches the touch panel 100 to shunt the electric field flux generated between the driving electrode 140 and the sensing electrode 120, and a resultant change in the electric field flux is output in the form of a current signal having a change in current. The current signal is input to the charge amplifier 200 through the sensing electrode 120.

The charge amplifier 200 converts the current signal output by the touch panel 100 into a voltage signal. A charge amplifier is also referred to as Q-V converter, and will be referred to as a charge amplifier or a signal conversion unit below. As an example of implementation of a charge amplifier, the charge amplifier 200 includes an operational amplifier 220, a capacitor C connected to an inverting input terminal and an output terminal of the operational amplifier 220, and a switch SW connected in parallel with the capacitor C to provide a path for discharging the capacitor C. The inverting input terminal of the operational amplifier 220 is electrically connected to the sensing electrodes 120 of the touch panel, and an output signal of the operational amplifier 220 is fed back to the inverting input terminal through the capacitor C. A non-inverting input terminal of the operational amplifier 220 is connected to a reference potential Vref. The reference potential Vref does not only denote ground potential but also denotes a potential serving as a reference in an electronic device, which may be identical to or different from ground potential according to the design of the electronic device.

The switch SW may be any switch capable of controlling whether or not to electrically connect two electrodes using an electric signal applied to its control electrode, irrespective of the type of the switch. As an example, a field effect transistor (FET) may be used as a switch for controlling whether or not to electrically connect its drain electrode and its source electrode using its gate electrode as a control electrode. As another example, a bipolar junction transistor (BJT) may be used as a switch for controlling whether or not to electrically connect its emitter electrode and its collector electrode using its base electrode as a control electrode. Also, it is possible to use a switch that includes at least one FET, at least one BJT, or at least one FET and at least one BJT.

A controller 300 applies a switching signal Vsw(t) to the control electrode of the switch SW connected between the inverting input terminal and the output terminal of the operational amplifier 220, thereby controlling the switch SW to close or open. When the switch SW is closed, charge stored in the capacitor C of the charge amplifier 200 is discharged, and the controller 300 applies the switching signal Vsw(t) so that the switch SW is closed for a sufficient time to completely discharge the charge stored in the capacitor C. The amount of charge stored in the capacitor C is determined according to factors, such as the capacitance of the capacitor C, and those of ordinary skill in the art would determine the sufficient time through general testing without any problems.

As an example, the controller 300 receives the driving signal $V_{TX}(t)$ output by the signal source Vsig to generate and apply the switching signal Vsw(t) capable of controlling the switch SW to the control electrode of the switch SW. As another example, the controller 300 may generate and apply the switching signal Vsw(t) to the control electrode of the switch SW at predetermined periods.

In exemplary embodiments described below, a configuration in which the two electrodes of the switch SW are electrically connected when a high signal is applied to the control electrode and the two electrodes are not electrically connected when a low signal is applied, will be described as an example. However, this example is intended for brief and clear description and is not intended to limit the scope of the present invention. In other words, according to another exemplary embodiment not shown in the drawings, it is also possible to electrically connect the two electrodes of the switch by applying a low signal to the control electrode and cut off the electrical connection between the two electrodes of the switch by applying a high signal.

Figure 4:
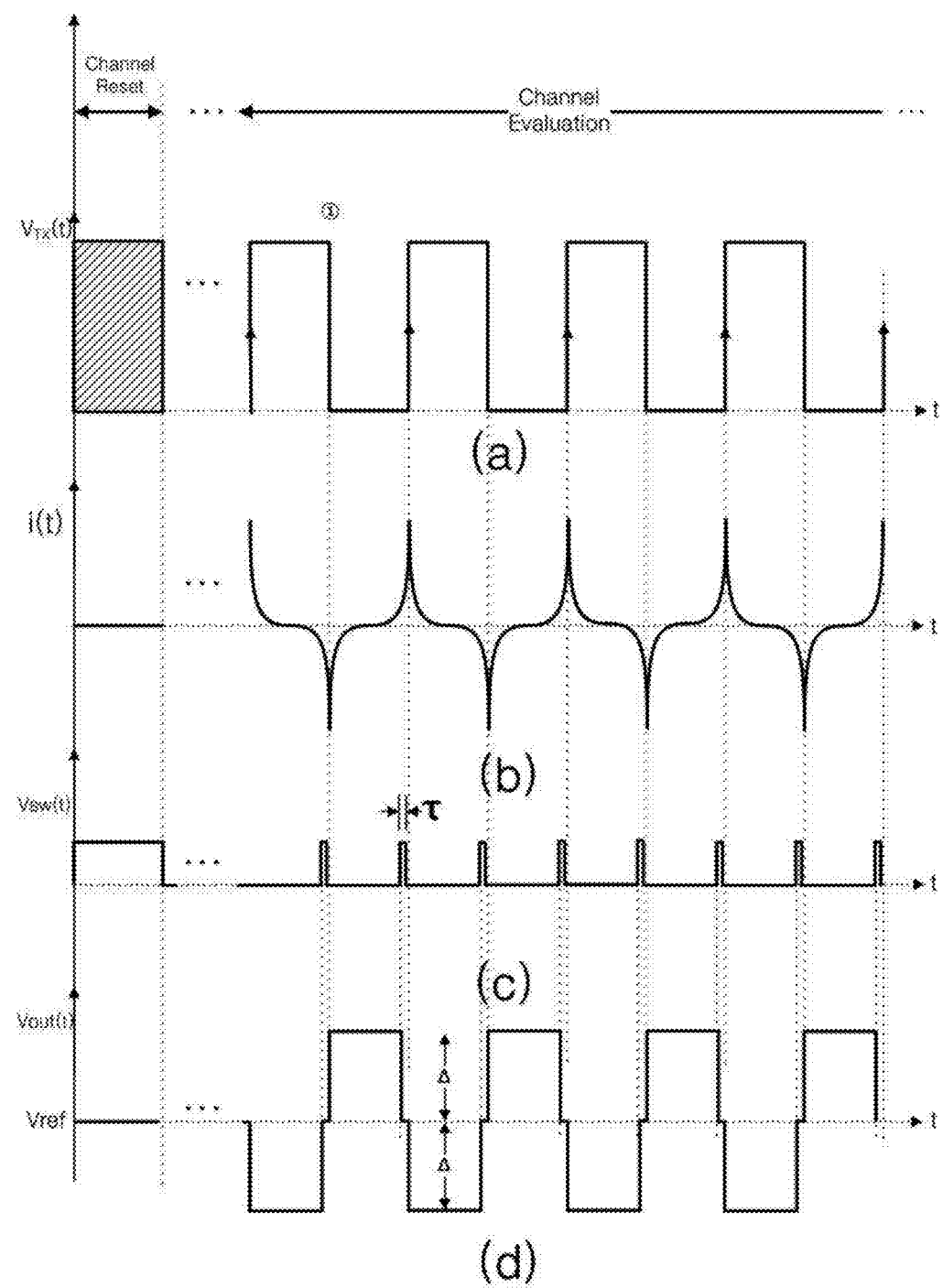
FIG. 4 is an example of timing diagrams of signals transmitted and received by a touch sensing apparatus according to an exemplary embodiment of the present invention.

FIG. 4 is an example of timing diagrams of signals transmitted and received when the touch sensing apparatus according to this exemplary embodiment employs a rectangular pulse train as a driving signal. Operation of the touch sensing apparatus having the above-described components will be described with reference to FIG. 4. In FIG. 4, before a touch sensing (channel evaluation) period for sensing a touch and obtaining information, such as touch coordinates and touch strength, channel initialization (channel reset) for initializing unnecessary information stored in the touch panel 100 and the capacitor C of the charge amplifier 200 is performed.

FIG. 4(a) is a timing diagram of the driving signal $V_{TX}(t)$ applied from the signal source Vsig to the driving electrodes 140. Referring to FIG. 4(a), during a channel initialization (channel reset) period, the signal source Vsig constantly applies a low level or a high level to the driving electrodes 140, thereby initializing a mutual capacitance $C_M$, a parasitic capacitance, etc. of the touch panel 100. Subsequently, during the touch sensing (channel evaluation) period, the signal source Vsig applies the driving signal $V_{TX}(t)$ to the driving electrodes 140 of the touch panel 100.

As mentioned above, the driving signal $V_{TX}(t)$ applied during the touch sensing (channel evaluation) period may be a pulse train, which is any one of a rectangular pulse train, a ramp pulse train, a triangular pulse train, and a sinusoidal pulse train. Using several shapes of pulse trains, it is possible to drive the touch panel 100.

As shown in FIG. 2, where $C_M$ indicates the capacitances of the mutual capacitors formed between the driving electrodes 140 and the sensing electrodes 120 and $V_{TX}(t)$ indicates the driving signal applied to the driving electrodes 140, a current signal i(t) generated by passing the driving signal $V_{TX}(t)$ through each mutual capacitor is represented by Equation 1 below.

$$i(t) = C_M \frac{dV_{TX}(t)}{dt} \quad \text{[Equation 1]}$$

In other words, when a touch is made by an object, a mutual capacitance is changed, and thus a current applied from the touch panel 100 to the charge amplifier 200 is changed. Also, it is possible to know that the current signal i(t) output to the charge amplifier 200 by the touch panel 100 is obtained by differentiating the driving signal $V_{TX}(t)$ with respect to time. Therefore, the driving signal $V_{TX}(t)$ applied to the driving electrodes 140 during the channel initialization (channel reset) period is fixed at a high level or a low level without a change over time, and no signal is output from the touch panel 100 to the charge amplifier 200 during the channel initialization (channel reset) period.

However, during the touch sensing (channel evaluation) period after channel initialization is completed, the signal source Vsig applies a pulse train changing over time as shown in the drawing as the driving signal $V_{TX}(t)$ to detect a touch. When the driving electrodes 140, the sensing electrodes 120, the lines, the capacitor $C_M$, etc. all are ideal, the current signal i(t) that is generated by applying the driving signal $V_{TX}(t)$ to the touch panel 110 has the shape of a Dirac-delta function due to differentiation of rising edges and falling edges of the driving signal $V_{TX}(t)$. However, since none of a path through which the driving signal $V_{TX}(t)$ is transferred, the driving electrodes 140, the sensing electrodes 120, and the capacitor $C_M$, is ideal, the current signal i(t) actually has the shape of a spike as shown in FIG. 4(b). In other words, the current signal i(t) has the shape of an upward spike due to differentiation of a rising edge of the driving signal $V_{TX}(t)$ and the shape of a downward spike due to differentiation of a falling edge of the driving signal $V_{TX}(t)$. The current signal i(t) generated in this ways is applied to the charge amplifier 200.

As shown in FIG. 4(b), the current signal i(t) output in the form of spikes by the touch panel 100 is generated by applying rising edges and falling edges of the driving signal $V_{TX}(t)$ to the touch panel, that is, modulated by the driving signal $V_{TX}(t)$. When a touch is made by an object, the corresponding touch information is transferred to the charge amplifier 200 in the form of the current signal i(t) modulated by the driving signal $V_{TX}(t)$.

Figure 3:
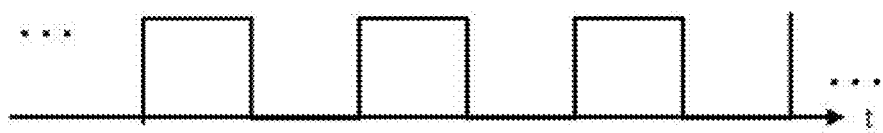
FIG. 3 is a diagram exemplifying some of the available driving signals.
Figure 3:
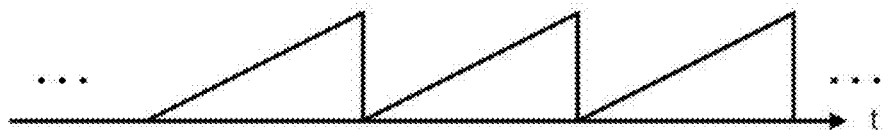
Figure 3:
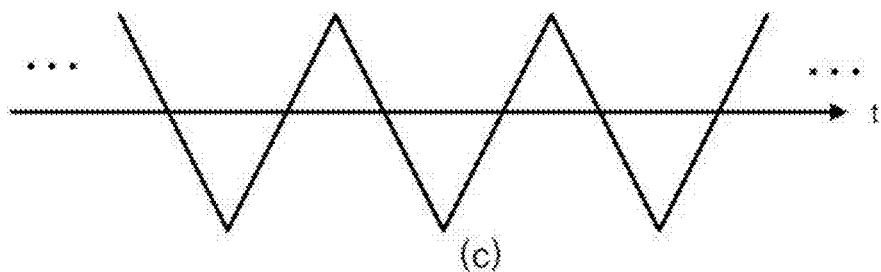
Figure 3:
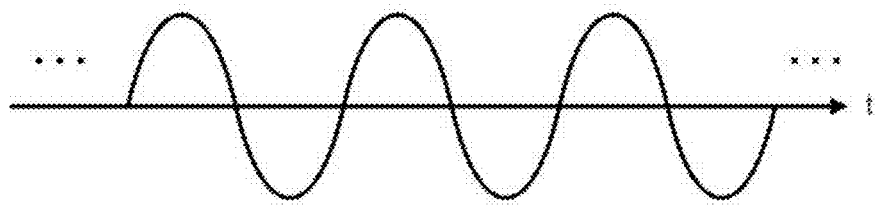

However, FIG. 4 exemplifies signals obtained when the signal source Vsig applies a rectangular pulse train to the driving electrodes 140 as the driving signal $V_{TX}(t)$, and the signal source Vsig may obtain similar output signals and perform the same function even by applying the pulse trains shown in FIG. 3 or several pulse trains not shown in the drawing.

When the current signal i(t) is applied from a sensing electrode 120 to the charge amplifier 200, the current signal i(t) is converted into a voltage signal by a charge accumulation operation of the capacitor C included in the charge amplifier 200, a voltage $V_C(t)$ obtained through the conversion at both terminals of the capacitor C is given by Equation 2 below.

$$V_C(t) = \frac{1}{C} \int_0^t i(r)\,dr + V_C(0) \qquad \text{[Equation 2]}$$

During the channel initialization (channel reset) period, the controller 300 controls the switch SW so that all charge stored in the capacitor C is discharged. Therefore, when a time point at which the channel initialization (channel reset) period is finished and touch sensing is attempted in the corresponding channel is t=0, an initial voltage signal value $V_C(0)$ at both terminals of the capacitor C is 0.

Subsequently, when the touch sensing (channel evaluation) period begins, the controller 300 controls the switch SW to open. The current signal i(t) applied from a sensing electrode 120 is integrated while passing through the capacitor C, and thus is converted into a voltage signal. When the current signal i(t) has the shape of an ideal Dirac-delta function, the voltage signal obtained by integrating the current signal i(t) has the form of a pulse. However, due to non-ideal characteristics of a panel, a transmission line, etc., the current signal i(t) does not have the shape of a Dirac-delta function but has the shape of a spike, and thus an actually obtained output waveform is not a perfect pulse shape but a pulse-like shape.

As can be seen from Equation 2 above, the voltage $V_C(t)$ at both capacitor terminals is changed based on an initial value of a previous state. In other words, when the channel initialization period is finished at t=0 and current is applied to generate a voltage $V_C(0)$ at both capacitor terminals, the voltage $V_C(t)$ at both capacitor terminals is changed based on $V_C(0)$, the voltage at t=0. Also, when the driving signal $V_{TX}(t)$ transitions from a high level to a low level or vice versa, the voltage $V_C(t)$ at both capacitor terminals is changed by the transition based on a voltage obtained when the driving signal $V_{TX}(t)$ is at a level immediately before the transition.

According to the virtual short principle of the operational amplifier 220, the non-inverting input terminal of the operational amplifier 220 is connected to the reference potential Vref, and thus the potential of the inverting input terminal is substantially the same as the reference potential Vref which is the potential of the non-inverting input terminal. Therefore, the potential of one terminal of the capacitor C connected to the inverting input terminal is substantially the same as the reference potential Vref. The other terminal of the capacitor C is connected to the output terminal of the charge amplifier 200, and thus a potential difference formed at the capacitor C is output as an output signal Vout(t) of the charge amplifier 200, which changes based on the reference potential Vref as shown in FIG. 4(d).

The output signal Vout(t) of the charge amplifier 200 is defined as Equation 3 below by rearranging Equation 1 and Equation 2 above.

$$V_{out}(t) = V_{ref} - V_C(t) = -\frac{C_M}{C} V_{TX}(t) + V_{ref} - V_C(0) \qquad \text{[Equation 3]}$$

Since the output signal Vout(t) of the charge amplifier 200 is generated based on the reference potential Vref when current is applied to the capacitor C, its voltage changes based on a voltage of a previous state as described above.

During the channel initialization (channel reset) period, the controller 300 closes the switch SW to discharge charge stored in the capacitor C included in the charge amplifier 200, thereby performing initialization. During the following touch sensing (channel evaluation) period, the controller 300 controls the switch SW to open and allows the current signal i(t) applied by the touch panel 100 to flow to the capacitor C, thereby converting the current signal i(t) into a voltage signal. However, the controller 300 applies the switching signal Vsw(t) to the control electrode of the switch SW so that the switch SW is closed and opened immediately before falling edges and rising edges of the driving signal $V_{TX}(t)$ are applied to the touch panel 100. Therefore, as the switch SW is closed, charge stored in the capacitor C is discharged.

The controller 300 controls the switch SW by applying the switching signal Vsw(t) so that the switch SW is closed for a sufficient time to discharge all the charge stored in the capacitor C, and controls the switch SW to open after the charge stored in the capacitor C is discharged. As the charge stored in the capacitor C is discharged, there is no potential difference between both capacitor terminals, and thus the output of the charge amplifier 200 changes to the reference potential Vref.

After the charge stored in the capacitor C is fully discharged, the controller 300 controls the switch SW to open, and the current signal i(t) having the shape of a spike flows to the capacitor C and forms a potential difference between both capacitor terminals. The charge amplifier 200 converts the applied current signal i(t) and outputs a voltage signal, and it is possible to know that the output signal $V_{OUT}(t)$ output by the charge amplifier 200 swings based on the reference potential Vref as shown in FIG. 4(d).

According to related art, after a current signal having the shape of a spike is applied, the output potential of a charge amplifier is maintained uniformly until immediately before the next spike of the current signal. On the other hand, according to this exemplary embodiment, charge stored in the capacitor C is discharged and the output of the charge amplifier 200 is returned to the reference potential Vref immediately before every spike of the current signal i(t) is applied. Subsequently, the switch SW is opened to apply the current signal i(t) having the shape of a spike to the charge amplifier 200. Then, the current signal i(t) is converted into a voltage signal, and the voltage signal is output.

Therefore, immediately before a downward current spike is applied to the charge amplifier 200, the switch SW is closed to discharge the capacitor C and return the output potential of the charge amplifier 200 to the reference potential Vref, and is opened to apply the current signal i(t) to the charge amplifier 200, so that the charge amplifier 200 outputs a signal in the form of a pulse swinging upwards from the reference potential Vref. Subsequently, immediately before an upward current spike is applied to the charge amplifier 200, the switch SW is closed to discharge the capacitor C and return the output potential of the charge amplifier 200 to the reference potential Vref, and is opened to apply the upward current spike to the charge amplifier 200, so that the charge amplifier 200 outputs a signal in the form of a pulse swinging downwards from the reference potential Vref.

Figure 5:
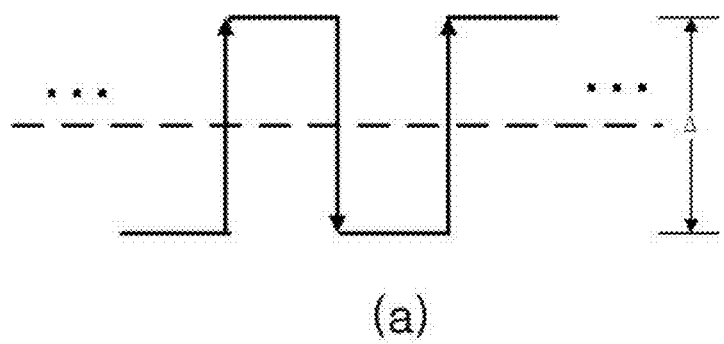
FIG. 5 is a diagram exemplifying output signals of an integrator according to related art and a charge amplifier according to the exemplary embodiment.
Figure 5:
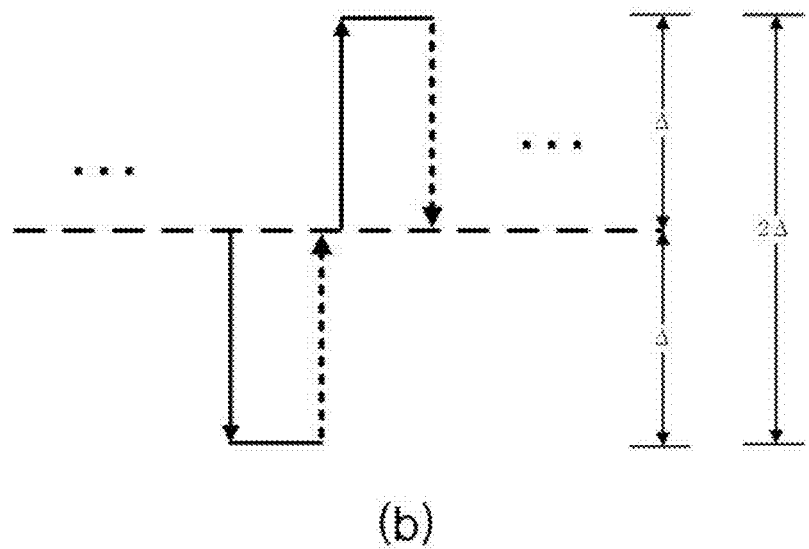

Referring to FIG. 5(a), when the output signal of a charge amplifier generated by a driving signal has an amplitude of $\Delta$, the output signal of an integrator according to the related art reaches the maximum amplitude. Subsequently, the output signal is changed by $\Delta$ by a current signal generated by an incoming edge of the driving signal to reach the minimum amplitude, and changed by $\Delta$ by an inverted edge following the edge to reach the maximum amplitude. In other words, the maximum swing of the output signal of the integrator according to the related art is only Δ as shown in the drawing.

On the other hand, according to the embodiment shown in FIG. 5(b), when any one edge of a driving signal having the same amplitude as shown in FIG. 5(a) is applied, the output voltage of the charge amplifier 200 swings by −Δ based on the reference potential Vref, and the switch SW is closed before the arrival of the next edge and discharges stored charge to return the output voltage of the charge amplifier 200 to the reference potential as indicated by a dashed line. Therefore, the output voltage of the charge amplifier 200 swings by Δ based on the reference potential Vref. Subsequently, since an inverted edge of the driving signal is applied while the switch SW is opened, the output potential of the charge amplifier 200 is changed by Δ based on the reference potential Vref to which the output voltage has been returned, and the switch SW is closed before the arrival of the following edge and discharges charge stored in the capacitor C, so that the potential of the charge amplifier 200 is returned to the reference voltage Vref as indicated by a dotted line. Therefore, the output voltage of the charge amplifier 200 swings by another Δ based on the reference potential Vref.

In other words, according to the related art, a charge amplifier is initialized during the channel initialization (channel reset) period only. On the other hand, according to this exemplary embodiment of the present invention, a capacitor of a charge amplifier is initialized not only during the channel initialization (channel reset) period but also periodically before the arrival of an edge of a driving signal. Therefore, the output signal of the charge amplifier swings in a larger width than in the related art.

Therefore, according to this exemplary embodiment, a switch is periodically closed to discharge stored charge in a capacitor, and it is possible to remarkably improve the swing of an output signal. By driving a touch sensing apparatus in this way, it is possible to increase the amplitude of an output signal compared to noise, and remarkably improve an SNR.

Figure 6:
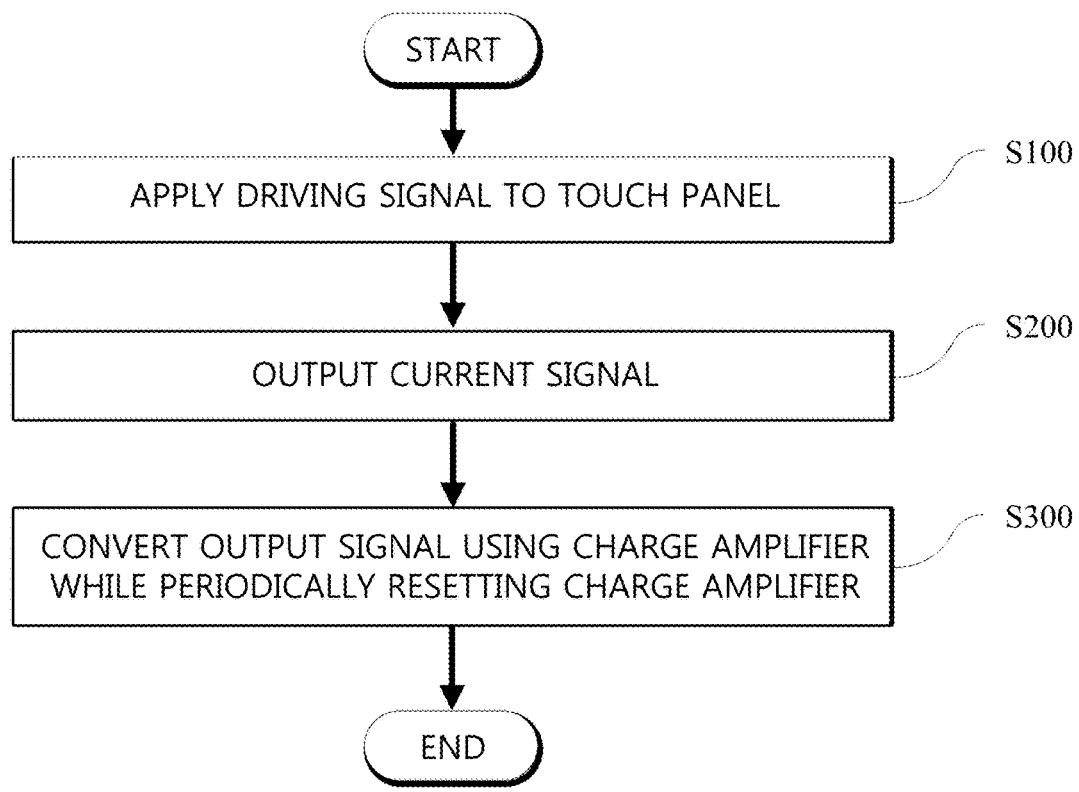
FIG. 6 is a flowchart illustrating the overview of a method of driving a touch sensing apparatus according to the exemplary embodiment of the present invention.

With reference to FIG. 6, a method of driving a touch sensing apparatus according to an exemplary embodiment will be described. For brief and clear description, the same details as described in the above exemplary embodiment may be omitted. FIG. 6 is a flowchart illustrating the overview of a method of driving a touch sensing apparatus according to this exemplary embodiment of the present invention. Referring to FIG. 6, the method of driving a touch sensing apparatus according to this exemplary embodiment includes an operation of applying a driving signal to a touch panel, an operation of outputting a current signal generated using the driving signal applied to the touch panel, and an operation of converting the output signal using a charge amplifier including an operational amplifier, a capacitor and a switch connected to an output terminal and an input terminal of the operational amplifier. The switch periodically discharges charge stored in the capacitor, thereby resetting the charge amplifier.

In S100, a driving signal is applied to a touch panel. As described above, the driving signal applied to the touch panel is a pulse train. As an example, the pulse train may be any one of a rectangular pulse train, a ramp pulse train, a triangular pulse train, and a sinusoidal pulse train. By using any one of several shapes of pulse trains, it is possible to drive the touch panel.

In S200, the touch panel to which the driving signal is applied outputs a current signal. For example, when the driving signal is a rectangular pulse train, the current signal output by the touch panel has the shape of a Dirac-delta function. However, due to non-ideal characteristics of a line, a capacitor, etc., the current signal has the shape of a spike.

In S300, a charge amplifier converts the current signal applied by the touch panel. For example, the charge amplifier includes an operational amplifier whose non-inverting input terminal is connected to a reference potential, and a capacitor connected between the inverting input terminal and an output terminal of the operational amplifier. The capacitor receiving the current signal has a potential difference between both ends thereof by accumulating charge, and thus the charge amplifier generates an output signal swinging based on the reference potential.

A controller controls a switch connected between the inverting input terminal and the output terminal of the operational amplifier to periodically discharge charge stored in the capacitor. For example, the controller controls the switch to open so that the current signal applied by the touch panel is converted into a voltage signal, and controls the switch to close before a rising edge and a falling edge of the driving signal so that charge stored in the capacitor included in the charge amplifier is discharged. The controller applies a switching signal to the control electrode of the switch so that the switch is closed for at least a time needed to discharge the charge stored in the capacitor. Therefore, as the charge stored in the capacitor is discharged, the output potential of the charge amplifier is returned to the reference potential. After the charge stored in the capacitor is discharged, the switch is opened, and a current having the shape of a spike is applied to the charge amplifier again. Accordingly, the charge amplifier swings from the reference potential to a potential difference caused by the applied current.

As described above, the output signal of the charge amplifier swings about two times larger than does the output signal of a charge amplifier according to the related art even when driving signals having the same potential difference are applied. Therefore, it is possible to obtain a higher SNR than a charge amplifier according to the related art, and thus a higher noise immunity can be obtained.

In addition, according to the related art, a voltage is doubled using a charge pump to amplify the output signal of an integrator. On the other hand, according to this exemplary embodiment, it is possible to obtain a signal having a two times higher swing even without using a charge pump. Further, when a voltage is doubled using this exemplary embodiment together with a charge pump, it is possible to obtain an output signal swinging in a still larger width, and implement a touch sensing apparatus having a further improved SNR and noise immunity.

Figure 7:
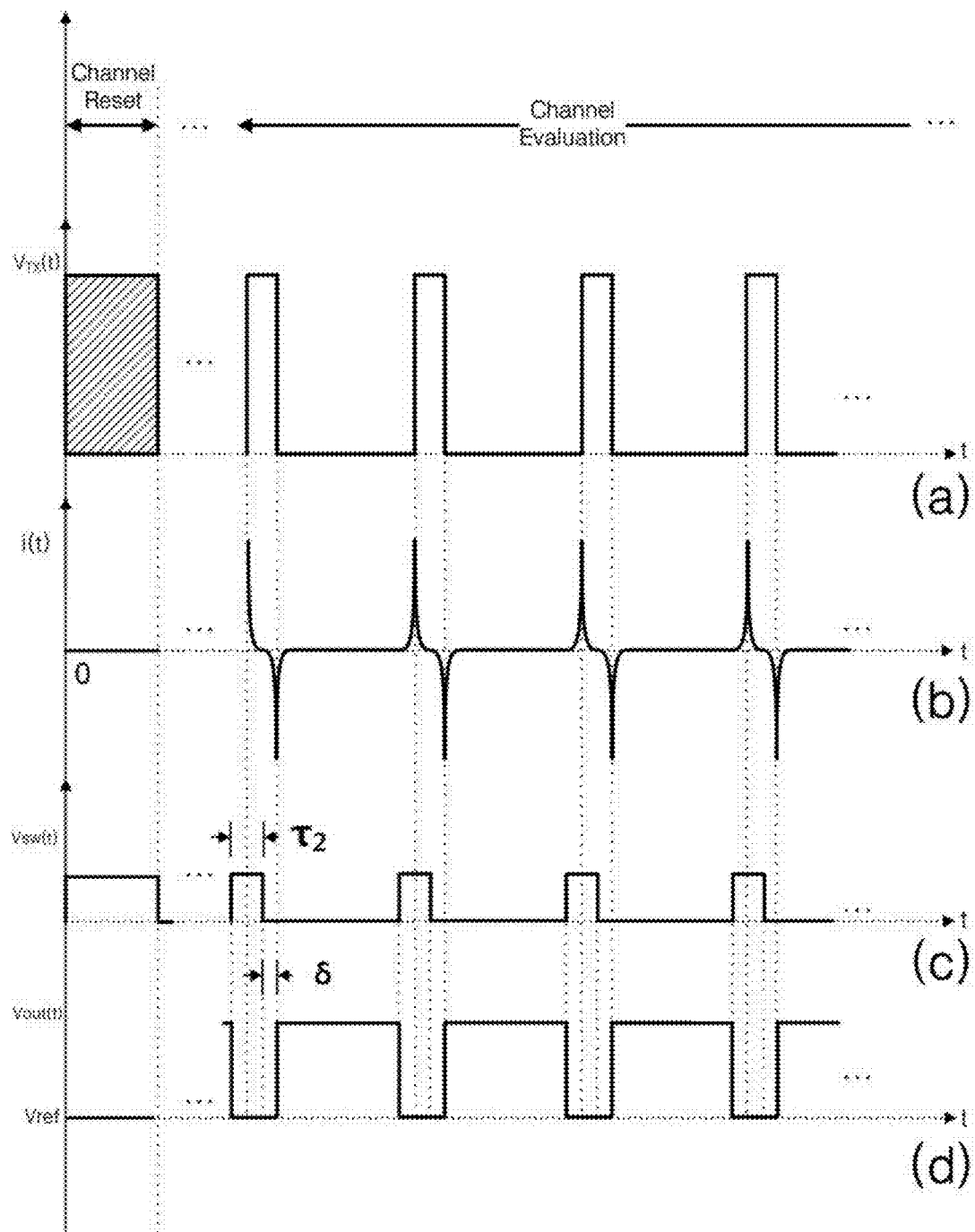
FIG. 7 is an example of timing diagrams of signals transmitted and received by a touch sensing apparatus according to another exemplary embodiment of the present invention.
Figure 8:
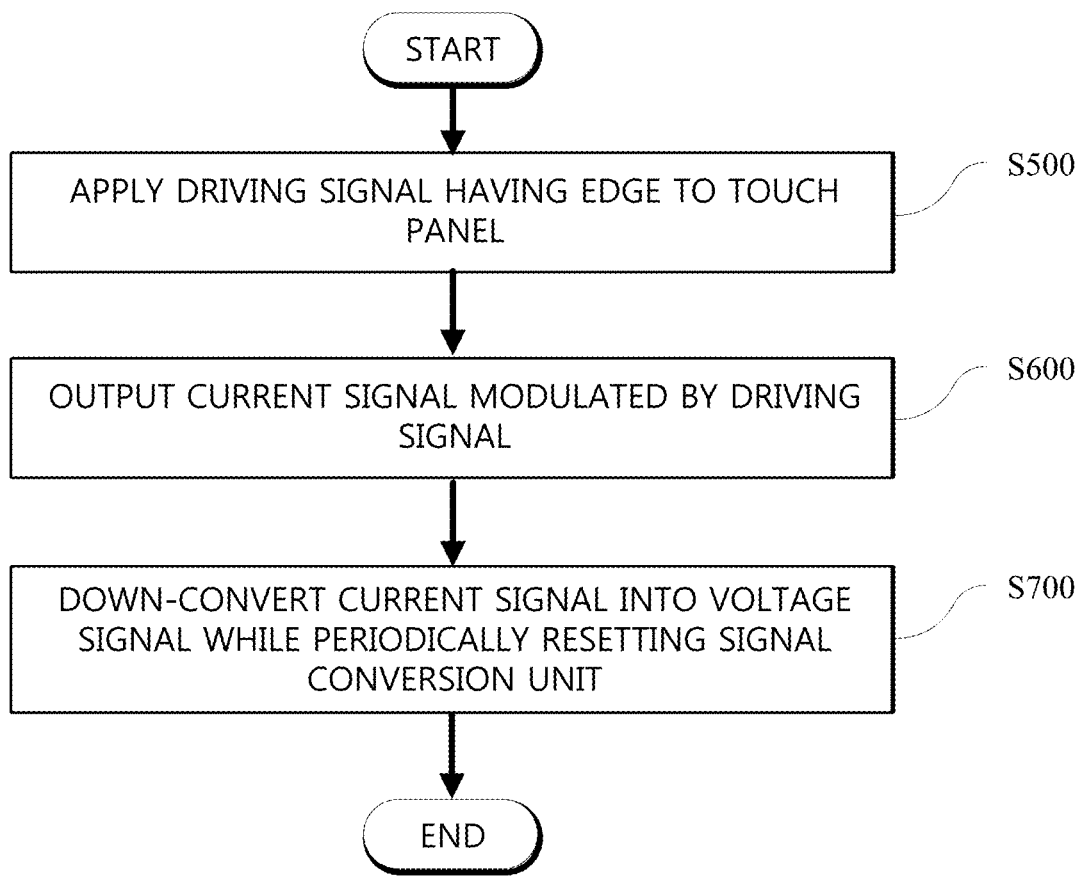
FIG. 8 is a flowchart illustrating the overview of a method of driving a touch sensing apparatus according to the other exemplary embodiment of the present invention.

With reference to FIGS. 1, 7, and 8, another exemplary embodiment of the present invention will be described. FIG. 7 is an example of timing diagrams of signals according to the other exemplary embodiment of the present invention, and FIG. 8 is a flowchart of a method of driving a touch sensing apparatus according to the other exemplary embodiment of the present invention. For brief description, the same details as described in the above exemplary embodiments may be omitted. Referring to FIGS. 1, 7, and 8, a signal source Vsig according to this exemplary embodiment outputs and applies a driving signal $V_{TX}(t)$ having rising edges and falling edges to a touch panel (S500). For example, the driving signal $V_{TX}(t)$ is a rectangular pulse train.

During a touch sensing (channel evaluation) period, the touch panel 100 to which the driving signal $V_{TX}(t)$ is applied outputs a current signal i(t) in the shape of a spike using the applied driving signal $V_{TX}(t)$ as described above. The current signal i(t) is modulated by the frequency of the driving signal $V_{TX}(t)$ and contains touch information (S600).

Referring to FIG. 7, this exemplary embodiment differs from the previous exemplary embodiment in that the controller 300 controls the switch SW so that a rising edge of the driving signal $V_{TX}(t)$ may be applied to the touch panel 100 during a period $\tau_2$ in which the switch SW is closed. In other words, while the switch SW is closed, a rising edge of the driving signal $V_{TX}(t)$ is applied to the touch panel 100. However, this exemplary embodiment is intended for brief and clear description and is not intended to limit the scope of the present invention. In other words, it is also possible to implement an exemplary embodiment in which the controller 300 controls the switch SW to close while a falling edge of the driving signal $V_{TX}(t)$ is applied to the touch panel 100.

FIG. 7 exemplifies a case in which the switch SW is closed when a switching signal is high. Although not shown in the drawing, if the switch SW is a switch closed by a low signal, a rising edge of the driving signal $V_{TX}(t)$ is applied to the touch panel 100 while the switching signal is low. Therefore, an upward spike of the current signal i(t) generated by applying the rising edge of the driving signal $V_{TX}(t)$ to the touch panel 100 bypasses the capacitor C through the closed switch SW of a signal conversion unit, and also charge stored in the capacitor C is discharged as the switch SW is closed. Therefore, an output voltage $V_{OUT}(t)$ of the signal conversion unit 200 becomes a reference voltage Vref (S700).

The controller 300 controls the switch SW to close immediately before a rising edge of the driving signal $V_{TX}(t)$ is applied. The controller 300 controls the switch SW to close for the sufficient time $\tau_2$ for a charge stored in the capacitor C to be fully discharged and for a current having the form of a spike due to the rising edge to bypass the capacitor C through the switch SW, and then controls the switch SW to open.

During a period $\delta$ which is a time until a downward spike of the current signal i(t) is applied to the signal conversion unit 200 after the controller 300 controls the switch SW to open, a weak current is applied from the touch panel 100 to the signal conversion unit 200, and thus the output signal $V_{OUT}(t)$ output by the signal conversion unit 200 converting the current signal i(t) is weak during the period $\delta$.

Subsequently, the current signal i(t) having the shape of a downward spike generated by applying a falling edge of the driving signal $V_{TX}(t)$ to the touch panel 100 is applied to the signal conversion unit 200. The applied current signal i(t) having the shape of a downward spike is not able to bypass the capacitor C because the switch SW is open, and instead flows to the capacitor C. Therefore, the current signal i(t) is converted into the voltage signal $V_{OUT}(t)$ and output in the form of a pulse shown in FIG. 7(d).

Referring to the output signal $V_{OUT}(t)$ of the signal conversion unit 200 shown in FIG. 7(d), except for the period $\tau_2$ in which the switch SW is closed to discharge charge stored in the capacitor C and thus the signal conversion unit 200 is reset, and the period $\delta$ until immediately before a downward current spike is applied to the signal conversion unit 200 after the switch SW is opened, the output signal $V_{OUT}(t)$ of the signal conversion unit 200 is down-converted to the direct current (DC) domain.

In other words, according to the related art, a driving signal and an output of an integrator having the same frequency and similar waveforms are mixed together to obtain a signal down-converted to the DC domain. However, according to this exemplary embodiment, the controller 300 may readily perform down conversion without using a mixer by only periodically resetting the signal conversion unit 200 before the arrival of any one of a rising edge or a falling edge of the driving signal $V_{TX}(t)$. In addition, when filtering is performed on the output signal $V_{OUT}(t)$ of the signal conversion unit 200 shown in FIG. 7(d) using a low pass filter, it is possible to remove a signal of an unintended high frequency band.

After analog-digital conversion is performed on a signal obtained in this way, a touch signal may be obtained by accumulating a digitized result and then performing an additional operation. In addition, by accumulating the digitized result, the noise is averaged out, and thus it is possible to reduce the influence of noise on the process of obtaining the touch signal.

According to this exemplary embodiment, without implementing the circuits of a mixer, a chopper, a rectifier, etc., it is possible to down-convert a signal output by a signal conversion unit to the DC domain. In other words, when this exemplary embodiment is implemented as an integrated circuit (IC), it is unnecessary to implement the circuits of a mixer, a chopper, a rectifier, and so on. Therefore, a die size can be reduced, and it is possible to reduce the power consumption of elements necessary for down conversion, such as a mixer, a chopper, a rectifier, and so on.

Exemplary embodiments of the present invention provide a signal conversion unit capable of obtaining a signal swinging with a larger amplitude than an existing signal conversion unit, a touch sensing apparatus including the signal conversion unit, and a method of driving the touch sensing apparatus. Therefore, according to exemplary embodiments of the present invention, it is possible to drive the touch sensing apparatus with a high SNR, and the influence of noise in touch sensing can be reduced.

In addition, exemplary embodiments of the present invention provide a charge amplifier that outputs a signal swinging with a larger amplitude than the output signals of other charge amplifiers even when a driving signal having the same amplitude as driving signals of the other charge amplifiers is applied, a touch sensing apparatus including the charge amplifier, and a method of driving the touch sensing apparatus.

Furthermore, exemplary embodiments of the present invention provide a touch sensing apparatus including a charge amplifier whose output signal swings with a large amplitude and which is capable of yielding a high SNR without a charge pump formed outside a chip.

Exemplary embodiments of the present invention provide a signal conversion unit capable of down-converting a touch signal modulated by a high frequency without using a down conversion module, such as a mixer or a chopper, a touch sensing apparatus including the signal conversion unit, and a method of driving the touch sensing apparatus. Therefore, the exemplary embodiments do not require a down conversion module, such as a mixer, and provide the economical advantage of a reduction in power consumption.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A touch sensing apparatus, comprising:
  a signal source configured to output a driving signal having first and second edges opposite to each other;

a touch panel configured to receive the driving signal and output a current signal modulated by the driving signal;

a signal conversion unit configured to convert the current signal output by the touch panel into a voltage signal, wherein the signal conversion unit comprises:

an operational amplifier having a non-inverting input terminal, an inverting input terminal, and an output terminal;

a feedback capacitor electrically connected to the inverting input terminal and the output terminal; and a feedback switch electrically connected in parallel with the feedback capacitor and configured to periodically reset the feedback capacitor; and a controller configured to control the signal conversion unit to turn on the feedback switch before the current signal formed by the first edge of the driving signal is output from the touch panel such that a time point at which the first edge of the driving signal is applied to the touch panel overlaps with a signal conversion unit reset period and the current signal formed by the first edge bypasses through the feedback switch to discharge the feedback capacitor, wherein the signal conversion unit is periodically reset to convert the current signal into the voltage signal down-converted and output the voltage signal, wherein the signal conversion unit reset period starts before the first edge of the driving signal is applied to the touch panel, and wherein the controller is configured to turn off the feedback switch before the current signal formed by the second edge of the driving signal is output from the touch panel such that the signal conversion unit converts the current signal formed by the second edge of the driving signal into the voltage signal by accumulating the current signal formed by the second edge in the feedback capacitor.

2. The touch sensing apparatus of claim 1, wherein the non-inverting input terminal of the operational amplifier is connected to a reference potential.

3. The touch sensing apparatus of claim 1, wherein the feedback switch comprises at least one of a field effect transistor (FET) and a bipolar junction transistor (BJT).

4. The touch sensing apparatus of claim 1, wherein the driving signal having the first and second edges is a rectangular pulse train having rising edges and falling edges.

5. The touch sensing apparatus of claim 1, wherein the touch panel comprises:

a dielectric substrate;

driving electrodes formed on one surface of the dielectric substrate; and sensing electrodes formed on the one surface or another surface of the dielectric substrate and electrically connected to the signal conversion unit.

6. The touch sensing apparatus of claim 5, wherein the driving signal is applied to the driving electrodes.

7. The touch sensing apparatus of claim 1, further comprising a low pass filter configured to remove high-frequency components of the voltage signal down-converted and output by the signal conversion unit.

8. A method of driving a touch sensing apparatus, the method comprising:

applying a driving signal having first and second edges opposite to each other to a touch panel;

generating a current signal modulated by the driving signal applied to the touch panel; and converting the current signal into a voltage signal using a signal conversion unit, wherein the signal conversion unit comprises:

an operational amplifier having a non-inverting input terminal, an inverting input terminal, and an output terminal;

a feedback capacitor electrically connected to the inverting input terminal and the output terminal; and a feedback switch electrically connected in parallel with the feedback capacitor and configured to periodically reset the feedback capacitor, wherein the converting of the current signal into the voltage signal comprises controlling the signal conversion unit such that a time point at which the first edge of the driving signal is applied to the touch panel overlaps with a signal conversion unit reset period, and down-converting the current signal into the voltage signal, wherein the signal conversion unit reset period starts before the first edge of the driving signal is applied to the touch panel, by turning on the feedback switch before the current signal formed by the first edge of the driving signal is output from the touch panel to bypass the current signal through the feedback switch and provide a path for discharging the feedback capacitor, and wherein the converting is performed by using the current signal formed by the second edge of the driving signal, by turning off the feedback switch before the current signal formed by the second edge of the driving signal is output from the touch panel to accumulate the current signal formed by the second edge of the driving signal in the feedback capacitor to form the voltage signal.

9. The method of claim 8, further comprising low-pass filtering the voltage signal.

10. The method of claim 8, wherein the applying of the driving signal comprises applying a rectangular pulse train.

* * * * *